(12) United States Patent
Pirogovsky et al.

(10) Patent No.: US 7,947,354 B2
(45) Date of Patent: May 24, 2011

(54) INSULATION BLANKET SYSTEM

(75) Inventors: Joseph Pirogovsky, Glenview, IL (US); Alex Spivak, Wheeling, IL (US)

(73) Assignee: Advance Thermal Corp., Chicago, IL (US)

( * ) Notice: Subject to any disclaimer, the term of this patent is extended or adjusted under 35 U.S.C. 154(b) by 352 days.

(21) Appl. No.: 12/136,715

(22) Filed: Jun. 10, 2008

(65) Prior Publication Data

US 2008/0307737 A1 Dec. 18, 2008

Related U.S. Application Data

(60) Provisional application No. 60/934,384, filed on Jun. 13, 2007.

(51) Int. Cl.
*F16L 59/14* (2006.01)

(52) U.S. Cl. .......................................... 428/76; 138/149
(58) Field of Classification Search .................... 428/76, 428/71; 137/375; 138/149; 285/47
See application file for complete search history.

(56) References Cited

U.S. PATENT DOCUMENTS

| 4,207,918 A * | 6/1980 | Burns et al. .................... 137/375 |
| 2006/0058157 A1 * | 3/2006 | Greiner et al. .................... 482/27 |
| 2006/0240215 A1 * | 10/2006 | Whaley .......................... 428/66.6 |
| 2007/0289974 A1 * | 12/2007 | Blair et al. ................. 220/560.15 |

* cited by examiner

*Primary Examiner* — Alexander Thomas
(74) *Attorney, Agent, or Firm* — Ungaretti & Harris LLP

(57) ABSTRACT

The present invention discloses a thermal insulating blanket (10) including an insulating core (41) encased in a fibrous envelope with at least one breather vent (50) in the upper portion of the outer enveloping cover (31) and at least one drain opening (60) in the lower portion of the outer enveloping cover.

18 Claims, 4 Drawing Sheets

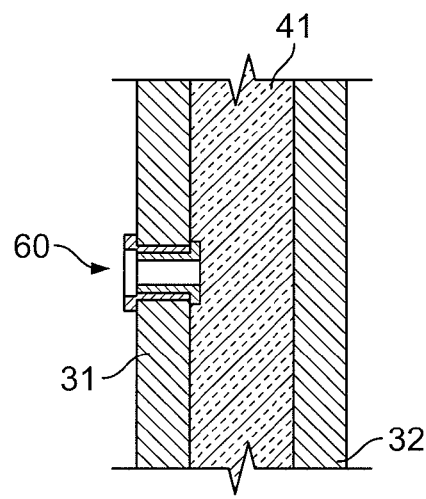
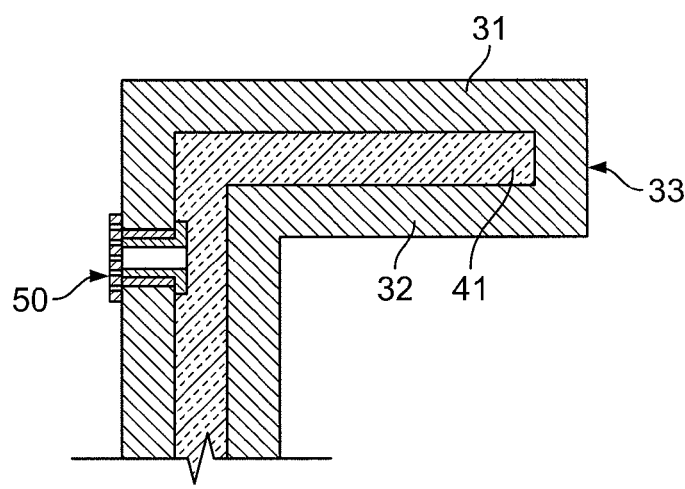
FIG. 1A  FIG. 1B
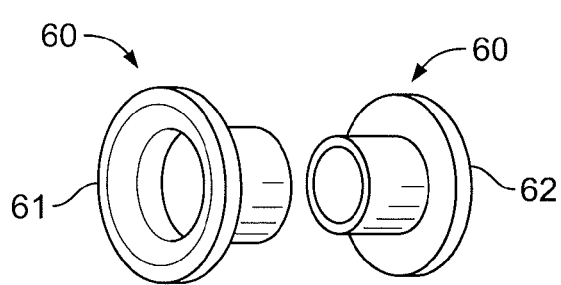
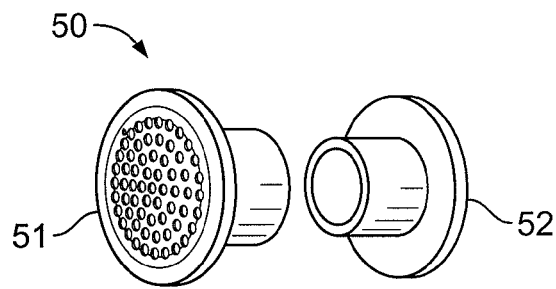
FIG. 2  FIG. 3 he present invention claims the benefit of U.S. Provisional Application No. 60/934,384 filed Jun. 13, 2007, which is incorporated herein by reference.

INSULATION BLANKET SYSTEM

CROSS-REFERENCE TO RELATED APPLICATIONS

The present invention claims the benefit of U.S. Provisional Application No. 60/934,384 filed Jun. 13, 2007, which is incorporated herein by reference.

FEDERALLY SPONSORED RESEARCH OR DEVELOPMENT

N/A

FIELD OF THE INVENTION

The present invention relates generally to insulating blankets and more specifically to insulation blankets for high temperature systems. The blanket can be selectively manufactured to encompass turbines, pumps and valves, piping/conduit (straight, elbows, valves, T's and Y's), fans and blowers, nuclear components, exchangers, headers and tanks, dryers and hoppers, and component parts and specialty equipment used for transporting or storing different materials in difficult environments. The thermal insulation blanket of the present development has an inner blanket core of aerogel material and is encapsulated by an insulative fabric cover that includes one or more drain openings and one or more breather vents.

DESCRIPTION OF THE PRIOR ART

Blanket-type insulation is frequently used in power plants and other extreme conditions requiring protection, insulation and/or acoustical dampening due to heat, cold and/or sound. Such blankets are typically removable and reusable and have a fiberglass core incased or encapsulated by a fiberglass or glass fabric. The blanket is held around the component, such as a vessel or pipe, by connectors, buckles/straps, spring clasps, and hook and loop type fasteners.

In some environments, the blankets are covered by metal jackets to protect the blankets from moisture. In indoor and outdoor environments wherein blankets are employed without a metal or water repellant/water-impervious outer jacket, the blankets have an inherited problem, they can absorb and hold moisture. Specifically, the blanket's outer fabric's weave and the needle holes in the seam can let moisture pass through the fabric layer to the inner insulating core.

The resulting wet-blanket becomes heavy, causing the blanket to sag down. The ingress and holding of water not only affects the insulating properties of individual components of the blanket (cover and core) but the geometry of the blanket relative to the object being insulated.

Blankets used in the manholes and tunnels can become completely submerged in water or surrounded by steam for extended periods. Once the water is removed from the surrounding environment, these blankets can be difficult, if not impossible, to remove as they are holding large amounts of water within. A standard 10" or 12" valve cover can weigh up to 200 lbs.

The present invention is provided to solve the problems discussed above and other problems. A full discussion of the features and advantages of the present invention is deferred to the following detailed description, which proceeds with reference to the accompanying drawings.

SUMMARY OF THE INVENTION

The present invention is directed to an insulation blanket system. The insulation blanket system comprises an insulating core produced from a flexible aerogel, an outer layer of a fabric, an inner layer of a fabric, a pair of opposing end layers of a fabric wherein the insulating layer is substantially encapsulated by a combination of the inner, outer, and pair of end layers; and a plurality of fasteners located adjacent the opposing end layers for drawing the pair of end layers together forming a substantially tubular arrangement.

The flexible aerogel of the insulation blanket system may be hydrophobic.

The flexible aerogel of the insulation blanket system may be doped with a hydrophobic agent.

The flexible aerogel of the insulation blanket system may be selected from the group consisting of: a silica aerogel, a nanoporous aerogel, and an aerogel with reinforcing fibers.

The insulating core of the insulation blanket system may have a thickness between 6 mm and 20 mm.

The insulating core of the insulation blanket system may comprise a first layer of the flexible aerogel and a second layer of the flexible aerogel.

The first and second layers of the insulation blanket system may have a thickness between 6 mm (0.24 ins.) and 10 mm (0.40 ins.)

The insulating blanket may further comprise a drain opening in the outer layer located adjacent the end layers exposing a portion of the insulating core.

The insulating blanket may further comprise a breather vent in the outer layer located opposite the opposing end layers exposing a portion of the insulating core.

The drain may be produced from a brass grommet.

The vent may be produced from a two-piece brass screen.

The insulating blanket of may further comprise a plurality of tuft supports in the outer layer enhancing structural integrity of the blanket.

The insulating blanket may further comprise a plurality of tuft supports in the inner layer enhancing structural integrity of the blanket.

The present invention is an improvement on existing systems and tries to alleviate the above problems. The improved blanket of the present development includes an inner blanket core of an aerogel material, preferably Pyrogel®E 6350 insulation or Pyrogel® 10350 insulation, and is encapsulated by an insulative fabric cover that includes one or more drain openings and one or more breather vents. The stitching is preferably Teflon® or like material and the hardware is pure brass.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1A is a sectional view along line A-A of FIG. 1;

FIG. 1B is a sectional view along line B-B of FIG. 1;

FIG. 2 is a detail drawing of the grommet used for the drain opening;

FIG. 3 is a detail drawing of the breather vent;

DETAILED DESCRIPTION

Figure 1:
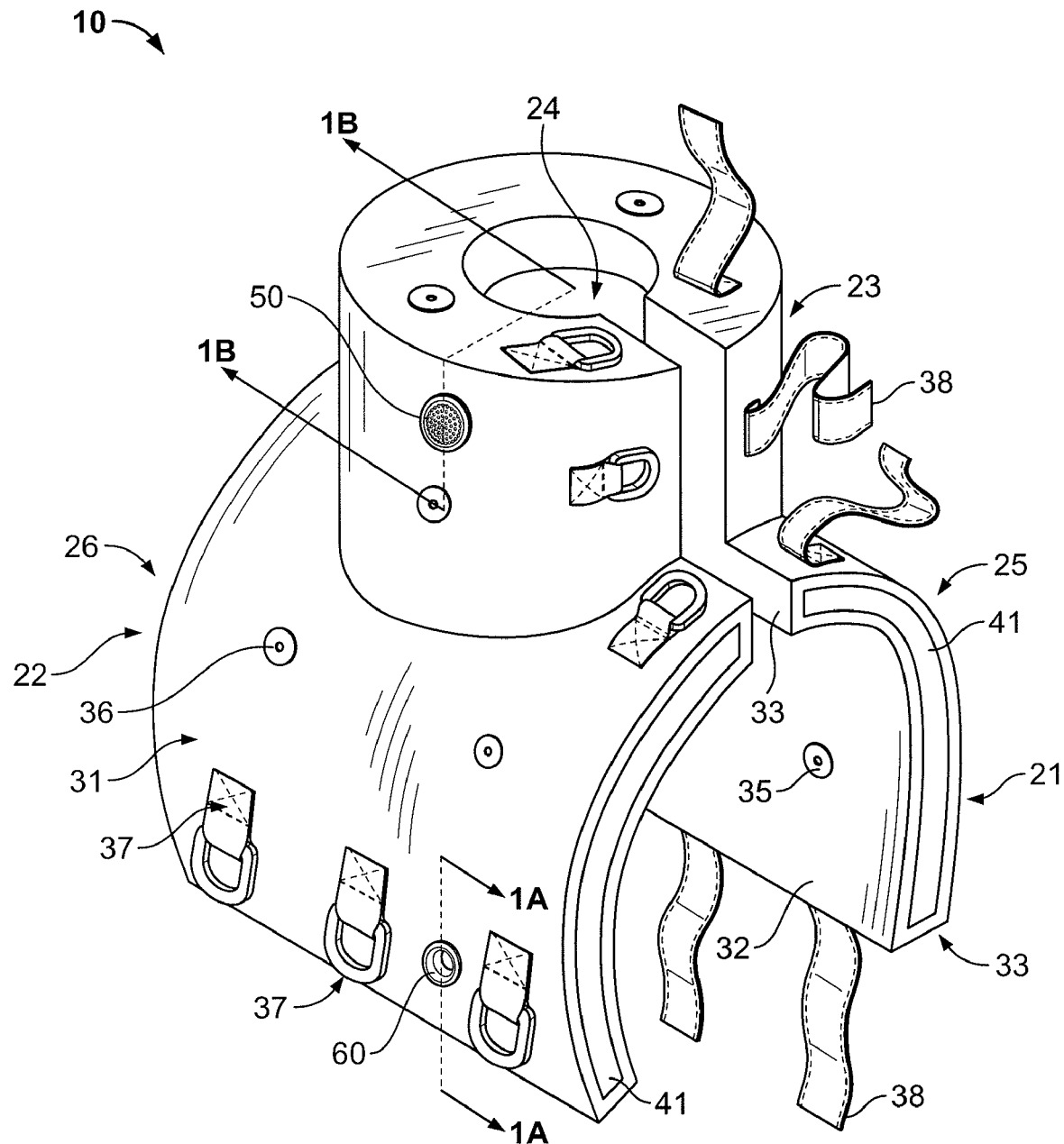
FIG. 1 is a perspective view (cross-section) of thermal insulation blanket made in accordance with the teachings of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A blanket made in accordance with the teaching of the present invention is shown in FIG. 1 by the general reference number 10. Blankets of this type are typically used in sections of piping/conduit having a valve connected thereto. Specifically, a front portion 21 of the blanket 10 covers a portion of the conduit going to the valve (not shown), a rear portion 22 of the blanket 10 covers a portion of the conduit leaving the valve, and an upper portion 23 of the blanket covers the valve, leaving an opening 24 for the valve control, such as a turning knob. In the construction of FIG. 1, the blanket 10 is constructed of two (2) halves, a right blanket portion 25 and a left blanket portion 26. The two blanket portions 25,26 are mated or placed in confronting relationship with their butt surfaces 33 abutting one another.

The blanket 10 has an outer fabric or skin 31, an inner fabric or skin 32, and a butt-end fabric or skin 33 encapsulating the insulating core 41. The fabric/skin is sewn together. A plurality of tuft supports 35,36 are sewn into the blanket 10 to enhance the structural integrity of the blanket and prevent shifting. A plurality of fasteners 37,38 are employed to secure the blanket in place around the component to be insulated. D-rings and straps are shown, however, it is recognized by those in the field that other fasteners can be used, such as hook and loop type fasteners, laces, etc.

As noted, once the blanket 10 halves 25,26 are put around the object to be insulated, the butt ends 33 of the blanket are pressed against one another in abutting relationship and the fasteners 37,38 are mated and locked to ensure the blanket stays in its desired location and position.

The blanket 10 includes one or more breather vents 50 in the upper portion of the blanket and one or more drain openings 60 in the lower portion of the blanket.

Figure 4:
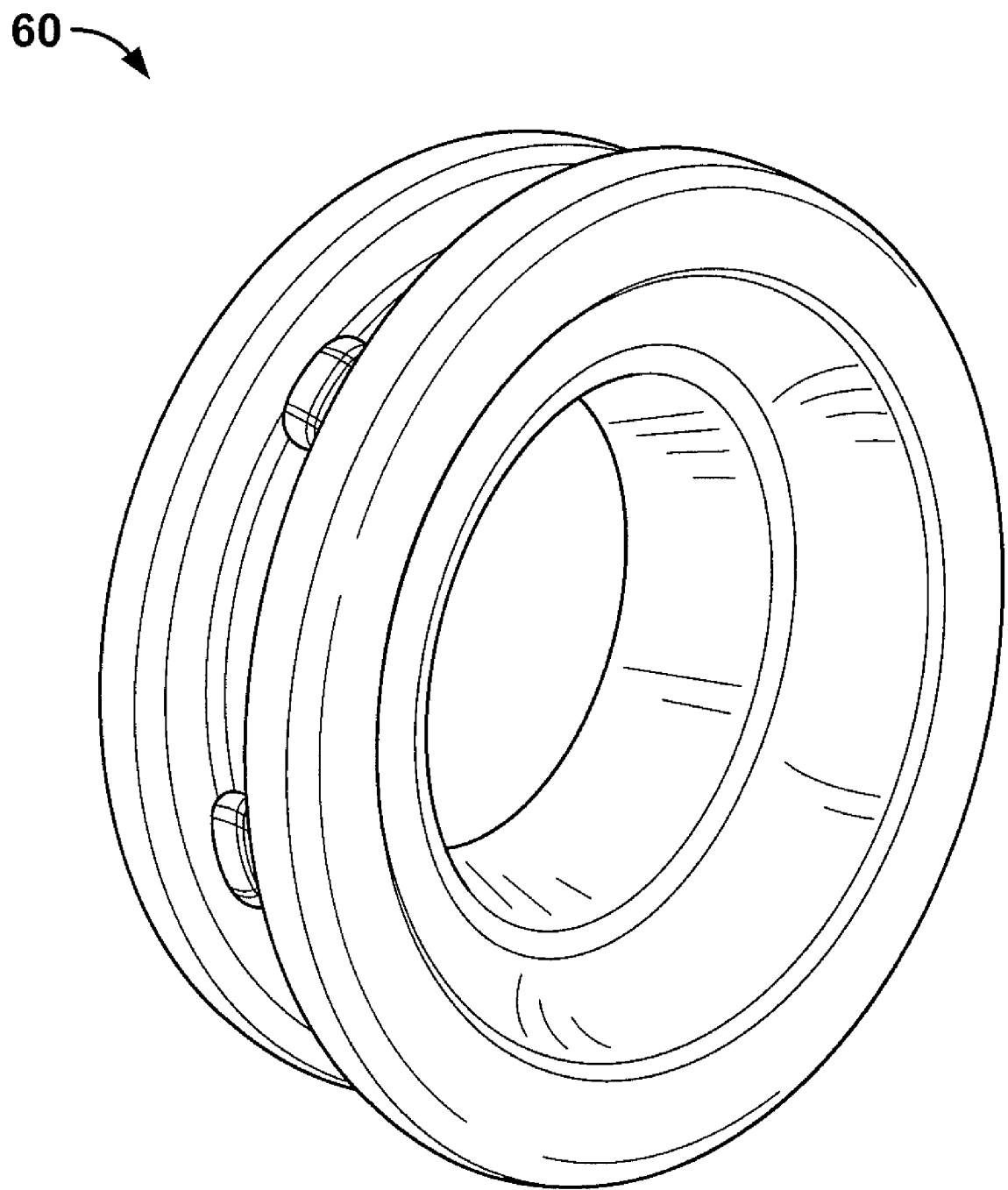
FIG. 4 is a perspective view of a grommet used in association with the drain opening.

The drain opening 60 provides an opening through the outer fabric 31 to the core 41. In the preferred embodiment, the opening 60 is supported or fixed by a two piece grommet 61,62 (FIG. 4), specifically a pure brass #1 grommet. It has been learned that pure brass is important as it does not corrode like stainless steel. The drain opening 60 permits liquids, such as water entering into the enclosed core to drain out of the system.

In the preferred embodiment, there are two (2) drain opening 60 per blanket on each side of the blanket (e.g., the right side and the left side of the blanket or the right blanket portion 25 and the left blanket portion 26). The preferred locations of the openings 60 are at the bottom of the valve (not shown), in the center and on each side of the valve.

Figure 5:
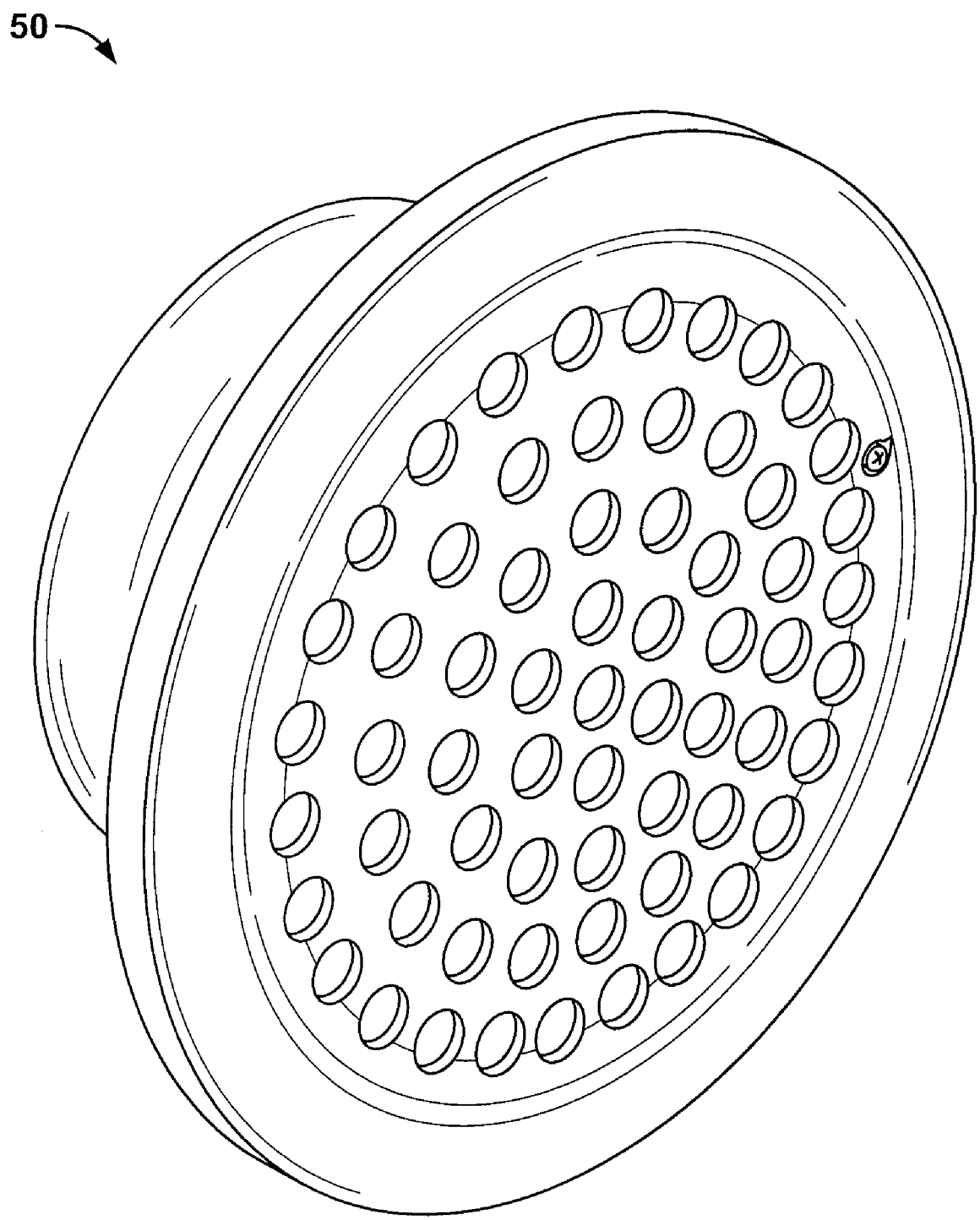
FIG. 5 is a perspective view of a vent used in association with the breather vent.

The purpose of the breather vent 50 is to permit air to enter the outer fabrics or skins 31 of the blanket to the core 41 and to let moisture escape in the form of steam or vapor. It has been found that to the extent residual moisture stays inside the skins 31,32,33 or on the core 41 and/or inner skin surfaces 32, mold can occur. The breather vent 50 is a pure brass vent #D3926. In the preferred embodiment, the opening vent 50 is supported or fixed by a two piece construction 51,52 (FIG. 5). At least one of the two pieces 51,52 includes a mesh, e.g., surface with a plurality openings therein with a mesh or particle size. The breather vent 50 is installed just like a standard grommet.

It should be noted that preferably all hardware associated with the blankets of the present invention (such as tags, hooks, D-rings, etc.) are made of pure brass and the threading used to sew/stitch the blankets is pure Teflon® or similar material.

As to core insulation 41, it is preferably made with Pyrogel® insulation, produced by Aspen Aerogels, Inc., Northborough, Mass. This material is a flexible aerogel, nanoporous insulation specifically designed for high temperature applications. Generally, aerogels are nanoporous solids created when silica is gelled in a solvent. When the solvent is removed, the remaining product is a puffed-up, sand-like substance with up to 99% porosity. The nanoporosity slows heat and mass transport, providing very low thermal conductivity. It has some of the following characteristics: very low thermal conductivity, high temperature resistance, good flexibility, and relatively easy of use. The material combines a silica aerogel with reinforcing fibers (non-woven, carbon- and glass-fiber batting). It can be cut using conventional textile cutting tools, including scissors, electric scissors and razor knives. The material can be stitched to high temperature cloth and encapsulated as with the present product.

The material is preferably used in two (2) thicknesses, that being 6 mm (0.24") (Pyrogel® 6350 insulation) and 10 mm (0.40") (Pyrogel® 10350 insulation). These sizes can be stacked to together to obtain thicknesses of 12 mm (0.48"), 20 mm (0.8"), 16 mm (0.64"), etc. Silica aerogels possess the lowest thermal conductivity of any known solid. For example, such aerogels can be used up to 725° F. (385° C.), are hydrophobic, and have a density of about 10.7 lb/ft$^3$ (0.17 g/cc). They are roughly 2 to 8 times better than other insulating products, and can be used with a smaller or reduced thickness or profile. They can be easily cut and conformed to complex shapes, tight curvatures, and spaces with restricted access. They are physically robust, soft and flexible but with excellent springback. For example the material recovers its thermal performance even after compression events as high as 50 psi. It has been found that the material has equal or better fire protection characteristics than mineral wool and/or calcium silicate. And, significantly, the material repels liquid but allows vapor to pass through. In addition, if the material is doped with a hydrophobic agent, it will help make the material resistant to moisture. Water ingression can be desorbed when the materials is exposed to a heated environment.

See Table 1 below.

TABLE 1

Product Specifications

| Product | Nominal Thickness | Thermal Conductivity | Density | Max. Use Temp. |
| --- | --- | --- | --- | --- |
| Pyrogel® 6350 | 6 mm 0.24 in | 15.5 mW/m-K 0.107 Btu-in/hr-ft$^2$-° F. | 0.17 g/cc 10.7 lb/ft$^3$ | 385° C. 725° F. |
| Pyrogel® 10350 | 10.0 mm 0.40 in | 15.5 mW/m-K 0.107 Btu-in/hr-ft$^2$-° F. | 0.17 g/cc 10.7 lb/ft$^3$ | 385° C. 725° F. |

In experiments, it has been found that with the lower K factor (thermal conductivity), two inches (2") of traditional Tem-Mat 9 lb./cu.ft density insulation can be replaced by 1 layer of the 6 mm and 1 layer of the 10 mm aerogel (approx. 16 mm or ¾"). It has been observed that for lower temperature environments, only one layer of the Pyrogel® insulation needs to be used, such as the 6 mm or the 10 mm sizes.

The terms "first," "second," "upper," "lower," "front," "back," etc. are used for illustrative purposes only and are not intended to limit the embodiments in any way. The term "plurality" as used herein is intended to indicate any number greater than one, either disjunctively or conjunctively as necessary, up to an infinite number. The terms "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings.

Many modifications and variations of the present invention are possible in light of the above teachings. It is, therefore, to be understood within the scope of the appended claims the invention may be protected otherwise than as specifically described.

What is claimed is:

1. An insulation blanket system comprising:
   an insulating core produced from a flexible hydrophobic aerogel;
   an outer layer of a fabric;
   an inner layer of a fabric;
   a pair of opposing end layers of a fabric wherein the insulating layer is substantially encapsulated by a combination of the inner, outer, and pair of end layers;
   a plurality of fasteners located adjacent the opposing end layers for drawing the pair of end layers together forming a substantially tubular arrangement; and
   a drain opening passing through the outer layer and terminating at the insulating core, exposing a portion of the insulating core and located adjacent the end layers.

2. The insulation blanket of claim 1 further comprising:
   a breather vent opening in the outer layer of fabric in fluid communication with and terminating at the insulating core for permitting liquids entering the substantially encapsulated core to escape the insulating core in the form or a steam or a vapor.

3. The insulating blanket of claim 1 wherein the flexible aerogel is doped with a hydrophobic agent.

4. The insulating blanket of claim 3 wherein the flexible aerogel is selected from the group consisting of: a silica aerogel, a nanoporous aerogel, and an aerogel with reinforcing fibers.

5. The insulating blanket of claim 4 wherein the insulating core has a thickness between 6 mm and 20 mm.

6. The insulating blanket of claim 5 wherein the insulating core comprises a first layer of the flexible aerogel and a second layer of the flexible aerogel.

7. The insulating blanket of claim 6 wherein the first and second layers of the flexible aerogel have a thickness between 6 mm (0.24 ins.) and 10 mm (0.40 ins).

8. The insulating blanket of claim 7 further comprising:
   a plurality of tuft supports in the outer layer enhancing structural integrity of the blanket.

9. The insulating blanket of claim 8 further comprising:
   a plurality of tuft supports in the inner layer enhancing structural integrity of the blanket.

10. An insulation blanket system comprising:
    an insulating core produced from a flexible hydrophobic aerogel;
    an outer layer of a fabric;
    an inner layer of a fabric;
    a pair of opposing end layers of a fabric wherein the insulating layer is substantially encapsulated by a combination of the inner, outer, and pair of end layers;
    a plurality of fasteners located adjacent the opposing end layers for drawing the pair of end layers together forming a substantially tubular arrangement;
    a breather vent opening in the outer layer of fabric in fluid communication with and terminating at the insulating core for permitting liquids entering into the substantially encapsulated core to escape the insulating core in the form or a steam or a vapor.

11. The insulation blanket of claim 10 further comprising:
    a drain opening in the outer layer of fabric in fluid communication with and terminating at the insulating core for permitting liquids entering into the substantially encapsulated core to drain out of the insulation blanket system.

12. The insulating blanket of claim 10 wherein the flexible aerogel is doped with a hydrophobic agent.

13. The insulating blanket of claim 12 wherein the flexible aerogel is selected from the group consisting of: a silica aerogel, a nanoporous aerogel, and an aerogel with reinforcing fibers.

14. The insulating blanket of claim 13 wherein the insulating core has a thickness between 6 mm and 20 mm.

15. The insulating blanket of claim 14 wherein the insulating core comprises a first layer of the flexible aerogel and a second layer of the flexible aerogel.

16. The insulating blanket of claim 15 wherein the first and second layers of the flexible aerogel have a thickness between 6 mm (0.24 ins.) and 10 mm (0.40 ins).

17. The insulating blanket of claim 16 further comprising:
    a plurality of tuft supports in the outer layer enhancing structural integrity of the blanket.

18. The insulating blanket of claim 17 further comprising:
    a plurality of tuft supports in the inner layer enhancing structural integrity of the blanket.

* * * * *